United States Patent Office 3,094,563
Patented June 18, 1963

3,094,563
AMINES AND UNSATURATED KETONES FROM TERTIARY ACETYLENIC AMINES
Carl W. Kruse and Roger F. Kleinschmidt, Bartlesville, Okla., assignors to Phillips Petroleum Company, a corporation of Delaware
No Drawing. Filed Sept. 6, 1960, Ser. No. 53,919
14 Claims. (Cl. 260—583)

The invention relates to a process for producing unsaturated ketones and amines from tertiary acetylenic amines.

In the copending application of C. W. Kruse and R. F. Kleinschmidt, S.N. 49,131, filed August 12, 1960, a method is disclosed for preparing certain types of acetylenic amines by the reaction of an alkyne higher than acetylene with a secondary amine. The products of such a reaction are novel compounds. It is an object of this invention to provide a process for the conversion of these tertiary acetylenic amines to unsaturated ketones and secondary amines.

A broad aspect of the invention comprises contacting an acetylenic amine of one of formulas (I) 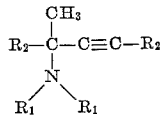

and (II) 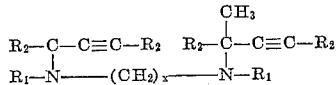

wherein each $R_1$ is selected from the group consisting of alkyl radicals containing from 1 to 6 carbon atoms and cycloalkyl radicals containing from 5 to 6 carbon atoms; wherein the two $R_1$'s on a single nitrogen atom can together with the nitrogen form a saturated heterocyclic ring containing from 5 to 6 ring atoms, said ring atoms other than nitrogen being selected from the group consisting of carbon and oxygen, with at least three of said ring atoms being carbon; wherein $x$ is an integer in the range of 2 to 8, wherein $R_2$ is selected from the group consisting of alkyl, aralkyl, alkylaralkyl, cycloalkyl, alkylcycloalkyl, polycycloalkyl, alkylpolycycloalkyl radicals containing from 1 to 10 carbon atoms, and —$CH_2$—O—$R_3$, wherein $R_3$ is a 1–10 carbon alkyl, with an aqueous solution of certain mineral acids. The terminology polycycloalkyl is intended to include monovalent radicals from saturated bicyclo or tricyclo bridged hydrocarbon ring systems.

The mineral acids which can be employed in the process of the present invention are sulfuric acid, hydrochloric acid, and phosphoric acid. Aqueous solutions of these acids are employed, said solutions containing from 1–90% by weight of the acid. When either hydrochloric acid or phosphoric acid is employed, it is preferred to employ concentrations of less than 15% by weight. When using sulfuric acid, a concentration of at least 15% by weight is preferred. The amount of acid employed should be sufficient such that the water in the aqueous mineral acid solution is present in an amount to provide at least one mole of water per mole of tertiary acetylenic amine being contacted with the aqueous mineral acid. A preferred range of moles of water per mole of amine is from 3 to 5.

The conversion of the tertiary acetylenic amines to unsaturated ketones and secondary amines is carried out by contacting the tertiary acetylenic amine with an aqueous solution of one of the above mineral acids at a temperature within the range of 0 to 200° C. A preferred range is from 50 to 150° C. The reaction is carried out as a liquid phase operation, so if amines boiling below the desired operating temperature are to be treated with an acid, superatmospheric pressures should be employed. In normal operations, however, atmospheric pressure is very satisfactory.

The reaction time for the contacting of the aqueous mineral acid with the acetylenic amine will generally be within the range between 10 minutes and 24 hours, although longer reaction times can be employed. The reaction time will, of course, be dependent upon the temperature of the reaction and the concentration of the aqueous mineral acid employed.

At the end of the desired reaction time, the reaction mixture is cooled, and it is preferred to dilute the reaction mixture if strong mineral acids have been employed. A convenient method for simultaneous cooling and diluting the reaction mixture is to pour the reaction mixture onto ice. The unsaturated ketones can be recovered at this point by such methods as steam distillation or extraction followed by fractionation. If desirable, the acid may be first neutralized with a suitable base to liberate the secondary amine product and unconverted starting material. Aqueous sodium hydroxide and ammonium hydroxide are very satisfactory agents for carrying out the neutralization. Following neutralization, the organic layer separates from the aqueous layer, and the ketone and amines can be recovered from the organic layer by methods well known to the art. For example, the organic layer can be extracted with solvents such as ethers, hydrocarbons, esters, such as ethyl acetate and the like. The extract can then be subjected to fractional distillation. The ketones can be further purified by other well known means such as solvent extraction and the like. An alternate method of recovery is to subject the organic layer to steam distillation.

It is also feasible to effect the hydrolysis and separation of the ketone by steam distillation from acid solution. Usually the amine forms a non-volatile salt with the acid and in this case the ketone can be removed from the reaction mixture as formed by steam distillation. In some cases, avoiding long contact of the ketone product with aqueous acid may be advantageous.

When the amines of Formula I above are contacted with an aqueous mineral acid according to the process of this invention substantially equimolar amounts of the compounds of the following formulas result:

(III) 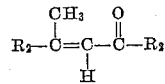

(IV) 

In the above formulas, $R_1$ and $R_2$ are as previously defined.

When one mole of one of the amines of Formula II is contacted with a mineral acid according to the process of this invention, substantially two moles of an unsaturated ketone of Formula III and one mole of an amine of the formula

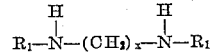

wherein $R_1$ is as previously defined, result.

Some examples of secondary amines which are produced by the process of this invention are dimethylamine, di-n-propylamine, di-sec-hexylamine, piperidine, morpholine, N,N'-dimethylethylenediamine, dicyclohexylamine, N,N'-di-n-hexylpropane-1,3-diamine, and N,N'-dicyclohexyloctane-1,8-diamine.

Some examples of unsaturated ketones which can be prepared by the process of this invention are 2-methylpropenyl methyl ketone (mesityl oxide), 2-methyl-1-octenyl n-hexyl ketone, 2-methyl-1-dodecenyl n-decyl ketone, 2-methyl-3-phenylpropenyl benzyl ketone, 2-methyl-6-phenyl-1-hexenyl 4-phenyl-butyl ketone, 2-methyl-4-(4-ethylphenyl))-1-butenyl 2-(4-ethylphenyl)ethyl ketone, 2-cyclohexylpropenyl cyclohexyl ketone, 2-(4-butylcyclohexyl)propenyl 4-butylcyclohexyl ketone, 2-pinylpropenyl pinyl ketone, 2-(methoxymethyl)propenyl methoxymethyl ketone, and 2-(n-decoxymethyl)propenyl n-decoxymethyl ketone.

The following specific example is intended to illustrate the process of this invention, but it is not intended that the process be limited to the specific embodiments shown therein.

*Example*

A run was carried out in which N,N,1,1-tetramethyl-2-butynylamine was contacted with an aqueous solution of sulfuric acid according to the method of this invention. (This amine can also be named 2-dimethylamino-2-methyl-3-pentyne.)

In this run, 10 grams (0.08 mol) of N,N,1,1-tetramethyl-2-butynylamine and an aqueous sulfuric acid solution which was prepared from 24 ml. of 96% $H_2SO_4$ (sp. gr. 1.84) and 6 ml. of water were mixed together and heated on a steam bath (approx. 100° C.) for one hour. The resulting solution was then poured into ice and left to stand overnight. Approximately 35 ml. of 30% by weight aqueous sodium hydroxide was then added. The oil layer was then extracted with ether, after which the ether layer was dried over magnesium sulfate and calcium sulfate. The ether was then stripped off at atmospheric pressure. The remaining oil was then distilled, and a cut, amounting to 3.1 grams and boiling at 130–134° C. at 760 mm. Hg absolute pressure was obtained. This cut contained a major proportion of mesityl oxide.

Treatment of this cut with 2,4-dinitrophenylhydrazine resulted in the formation of a solid material, M.P. 200–201° C. A mixed melting point with an authentic sample of the 2,4-dinitrophenylhydrazone of mesityl oxide was not depressed thus establishing that the product obtained was mesityl oxide. The cut was also found to contain some unreacted N,N,1,1-tetramethyl-2-butynylamine.

The above procedure was repeated, except that 0.4 gram of mercuric sulfate was charged with the amine and $H_2SO_4$. In this run 3.8 grams of the same product, mesityl oxide, was obtained.

The products of the reaction in the foregoing example were dimethyl amine and mesityl oxide (2-methylpropenyl methyl ketone).

Certain modifications of the invention will become apparent to those skilled in the art and the illustrative details disclosed are not to be construed as imposing unnecessary limitations on the invention.

We claim:

1. A process comprising contacting with an aqueous solution of a mineral acid of the group consisting of sulfuric, hydrochloric, and phosphoric, an acetylenic amine having a formula of the group consisting of (I)
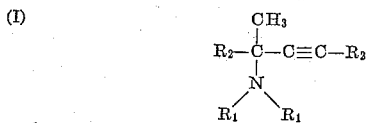

and (II)
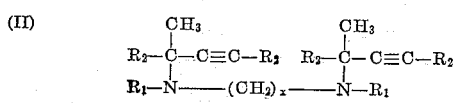

wherein each $R_1$ is selected from the group consisting of alkyl radicals containing from 1 to 6 carbon atoms and cycloalkyl radicals containing from 5 to 6 carbon atoms; wherein the two $R_1$'s on a single nitrogen atom can together with the nitrogen form a saturated heterocyclic ring containing from 5 to 6 ring atoms, said ring atoms other than nitrogen being selected from the group consisting of carbon and oxygen, with at least three of said ring atoms being carbon; wherein $x$ is an integer in the range of 2 to 8, wherein $R_2$ is selected from the group consisting of alkyl, aralkyl, alkylaralkyl, cycloalkyl, alkylcycloalkyl, polycycloalkyl, alkylpolycycloalkyl radicals containing from 1 to 10 carbon atoms, and —$CH_2$—O—$R_3$, wherein $R_3$ is a 1–10 carbon alkyl, at a temperature in the range of 0 to 200° C., an acid concentration in the range of 1 to 90 percent by weight, and with at least 1 mole of water per mole of acetylenic amine so as to hydrolyze said amine and form at least one ketone and an amine.

2. The process of claim 1 wherein the amount of water is in the range of 3 to 5 moles per mole of said acetylenic amine.

3. The process of claim 1 wherein the temperature is in the range of 50 to 100° C.

4. The process of claim 3 wherein said acid is hydrochloric, the concentration of acid in said solution is less than 15 percent by weight, and the water therein amounts to at least one mole per mole of said acetylenic amine.

5. The process of claim 3 wherein said acid is phosphoric the concentration thereof in said solution is less than 15 percent by weight, and the water therein amounts to at least one mole per mole of said acetylenic amine.

6. The process of claim 1 including the steps of cooling the reaction mixture and diluting same with water after a reaction time of at least 10 minutes and separately recovering the ketone and amine products.

7. The process of claim 1 including the steps of simultaneously cooling and diluting the reaction mixture by adding ice thereto after at least 10 minutes reaction time; neutralizing the cooled mixture with a base, whereby an organic layer containing the ketone and amine separate from an aqueous layer; recovering the organic layer; and separately recovering the ketone and amine products from said organic layer.

8. The process of claim 1 wherein the reaction mixture in acid condition is steam distilled to effect removal of the ketone product as formed.

9. The process of claim 1 wherein N,N,1,1-tetramethyl-2-butynylamine is hydrolyzed to produce mesityl oxide and dimethyl amine.

10. The process of claim 9 wherein reaction temperature is in the range of 50 to 100° C., the amount of water is in the range of 3 to 5 moles per mole of acetylenic amine, the concentration of said acid in said solution is in the range of 1 to 90 percent by weight.

11. The process of claim 10 using sulfuric acid as said acid at a concentration of at least 15 percent by weight.

12. The process of claim 1 using sulfuric acid as said acid.

13. The process of claim 1 using hydrochloric acid as said acid.

14. The process of claim 1 using phosphoric acid as said acid.

References Cited in the file of this patent

UNITED STATES PATENTS 2,110,199 Carothers _____ Mar. 8, 1938